Aug. 11, 1964    H. S. GOODFELLOW ETAL    3,144,009
VARIABLE VALVE TIMING MECHANISM
Filed May 14, 1962                          2 Sheets-Sheet 1

INVENTORS
HOMER S. GOODFELLOW
EVERETT S. GOODFELLOW
BY
Merchant, Merchant & Gould
ATTORNEYS

United States Patent Office 3,144,009
Patented Aug. 11, 1964

3,144,009
VARIABLE VALVE TIMING MECHANISM
Homer S. Goodfellow and Everett S. Goodfellow, both of 1207 Washington Ave. N., Minneapolis, Minn., assignors of one-half to Dick Schoep, Minneapolis, Minn.
Filed May 14, 1962, Ser. No. 194,608
3 Claims. (Cl. 123—90)

Our invention relates generally to valve operating means for internal combustion engines, and more particularly to improvements in means for varying the valve timing of internal combustion engines.

It is well known to those skilled in automotive engine design that the timing of the intake and exhaust valves of an internal combustion engine has a direct bearing on the efficiency of the engine at different operating speeds thereof; and that the timing of the valves for peak efficiency at one given speed of the engine will cause the engine to operate at a highly reduced efficiency at other speeds. Hence, in the case of most passenger cars and trucks, the timing of valves heretofore has been a compromise to provide nominal engine efficiency at most speeds within the operating range of the engine.

An important object of our invention is the provision of novel means for varying the valve timing of internal combustion engines in accordance with the speed of operation thereof to produce peak efficiency of engine operation over the entire range of operating speeds thereof.

Another object of our invention is the provision of mechanism for varying the valve timing of an engine, which may be installed in an existing engine with a minimum of modification to the engine. To this end, we provide a cam shaft which is driven by the engine in the usual manner, said cam shaft having intake and exhaust cams thereon operatively coupled to the intake and exhaust valves respectively of the engine, and secondary or auxiliary cam elements on said cam shaft and movable relative thereto between inoperative and operative positions relative to a cam follower included in the linkage between the cam shaft and the valves operated thereby.

Another object of our invention is the provision of variable valve timing mechanism as set forth, which is extremely simple and inexpensive to produce and install, which has relatively few moving parts, which is highly efficient in operation, and which is rugged in construction and durable in use.

The above, and still further highly important objects and advantages of our invention will become apparent from the following detailed specification, appended claims, and attached drawings.

Referring to the drawings, which illustrate the invention, and in which like reference characters indicate like parts throughout the several views:

FIG. 3 is a further enlarged fragmentary section taken substantially on the line 3—3 of FIG. 2;

FIG. 4 is a fragmentary section taken substantially on the line 4—4 of FIG. 3;

FIG. 5 is a view corresponding to FIG. 3, but showing a different position of some of the parts;

FIG. 6 is a fragmentary section taken substantially on the line 6—6 of FIG. 5; and FIGS. 7, 8 and 9 are diagrammatic views illustrating the valve timing achieved by our improved mechanism at different engine speeds.

Figure 1:
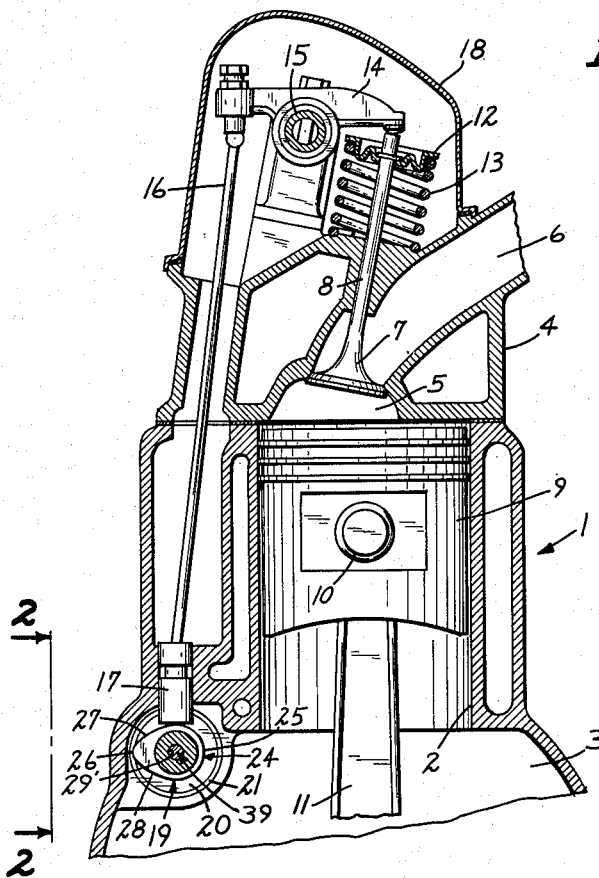
FIG. 1 is a fragmentary view in vertical section, taken transversely through the block and cylinder head portion of an internal combustion engine of the overhead valve type, incorporating our invention.
Figure 2:
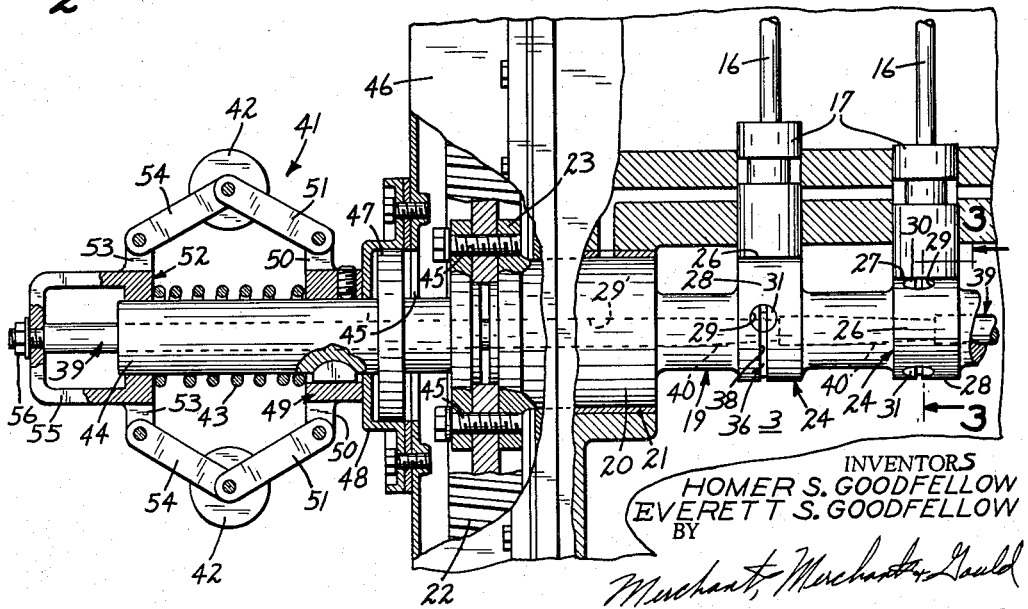
FIG. 2 is a fragmentary view, in side elevation, of a portion of the engine of FIG. 1, and as seen from the line 2—2 of FIG. 1, some parts being broken away and some parts being shown in section.

In the drawings, and with particular reference to FIGS. 1 and 2, an internal combustion engine is fragmentarily shown as comprising, a block 1 defining a cylinder 2 and the upper portion of a crankcase 3, a cylinder head 4 mounted on the upper end of the cylinder block 1 by suitable means not shown, and defining a combustion chamber 5 and a port 6 that is normally closed by a conventional valve 7 of the poppet type and formed with an elongated valve stem 8 slidably mounted in the cylinder head 4 in the usual manner. The engine further includes a reciprocatory piston 9 axially slidable in the cylinder 2, the piston 9 being provided with the usual wrist pin 10 to which is mounted the upper end of the usual connecting rod or the like 11, the lower end of which may be assumed to be journalled on a crankshaft, not shown. The block 1 may be formed with any number of cylinders 2 and cooperating pistons 9; however, for the purpose of the present example, but one of each thereof is shown. Although but one valve 7 is shown, it will be appreciated that, for each cylinder 2, a pair of valves are utilized, one thereof being the intake valve, and the other thereof being the exhaust valve. In the interest of brevity, and by reason of the fact that the valves are substantially identical, only one valve and its operating linkage is shown.

With further reference to FIG. 1, it will be seen that the upper end of the valve stem 8 is provided with a spring retaining washer or the like 12, between which and the underlying portion of the cylinder head 4 is interposed a coil compression spring 13 which yieldingly urges the valve 7 toward its closed position. The upper end of the valve stem 8 is engaged by one end of a rocker arm 14 that is suitably journalled on a rockshaft or the like 15 carried by the cylinder head 4, the opposite end of the rocker arm 14 engaging the upper end of a conventional push rod 16. The lower end of the push rod is seated in and adapted to be moved by a cam follower in the nature of a conventional valve lifter or tappet 17 that is generally cylindrical in shape and axially slidably mounted in the cylinder block 1. Two of the push rods 16 and valve lifters or tappets 17 are shown in FIG. 2; and it may be assumed that one of the push rods and lifters 16 and 17 respectively are used in connection with the intake valve and the other thereof for the exhaust valve associated with the combustion chamber 5. The valve springs 13 and rocker arms 14 are enclosed within the usual valve cover 18 secured to the top of the cylinder head 4 by screws or the like not shown.

A cam shaft 19 is provided at its opposite end portions with enlarged journals 20 that are rotatably mounted in opposite end portions of the block 1, by means of suitable bearings or the like 21, one of the journals 20 and bearings 21 being shown in FIG. 2. With further reference to FIG. 2, it will be seen that a timing gear 22 is bolted or otherwise rigidly secured to a flange 23 on one end of the cam shaft 19, the timing gear 22 being operatively connected to the crankshaft of the engine, not shown, whereby rotary movement is imparted to the cam shaft 19 at one-half the speed of rotation of the crankshaft, as is usual with internal combustion engines of the four stroke or four cycle variety commonly employed in automotive vehicles.

The cam shaft 19 is formed to provide a plurality of axially spaced primary cam elements 24, each underlying a different one of the cam followers or lifters 17. Each cam element 24 is formed to provide diametrically opposed peripheral heel and toe surfaces 25 and 26 respectively, a lifting surface 27, and a lowering surface 28. The lifting surface 27 tangentially connects one end portion of the toe surface 26 to an adjacent end portion of the heel surface 25, the lowering surface 28 tangentially connecting the opposite end portion of the toe surface 26 with the adjacent end portion of the heel surface 25, of each cam 24, see particularly FIGS. 3 and 5. As shown, each of the cam followers 17 rests upon an underlying one of the primary cam elements 24, and operates to open its respective valve 7 upon rotation of the cam shaft 19, the valves 7 being closed by their respective valve springs 13.

The cam elements 24 are so shaped that the toe surfaces 26 thereof are disposed a substantially greater radial distance from the axis of the cam shaft 19 than are the heel surfaces 25 thereof, the cam follower elements 17 engaging the yield surfaces 25 when their respective valves 7 are in their closed positions. Moreover, it will be noted that the toe surfaces 26 are of much smaller radius than the heel surfaces 25, in keeping with practices usually followed in automotive cam shaft design. For the purpose of our invention, the heel surface 25 of each cam element 24 extends for an angular distance greater than 180 circular degrees, the tapering of the lifting and lowering surfaces 27 and 28 respectively and the angular dimension or radius of the toe surface 26 being such as to open its respective valve 7 and permit closing thereof at times best suited for high operating efficiency of the engine at idling or low operating speeds. Each primary cam element 24 is provided with a transverse passage 29 extending therethrough from the lifting surface 27 thereof to the lowering surface 28 thereof and the adjacent end portions of the heel surface 25 thereof. As shown in FIGS. 3 and 5, the transverse passage 29 at least partially intersects an axial bore 29' in the crankshaft 19, for a purpose which will hereinafter become apparent. A pair of secondary or auxiliary cam elements 30 and 31, generally cylindrical in cross section, are slidably received in the opposite end portions of the passage 29. The auxiliary cams 30 and 31 are provided with cam faces 32 and 33 respectively at their outer ends, and are grooved or recessed, as indicated at 34 and 35 respectively for reception of the opposite ends of an arcuate spring 36, the intermediate portion 37 of which is contained in a radially outwardly opening circumferentially extending groove or channel 38 in the heel surface 25 of each primary cam 24. The spring 36 of each cam 24 yieldingly urges its respective auxiliary cam elements 30 and 31 axially inwardly of their respective passage 29 toward a retracted position of the auxiliary cam elements 30 and 31, as shown in FIGS. 3 and 4. In this position of the auxiliary cam elements 30 and 31, the respective cam faces 32 and 33 thereof are preferably flush with the adjacent lifting and lowering surface portions of their respective primary cam 24 with the adjacent end portions of the primary cam 24 and the adjacent end portions of the heel surfaces 25 thereof.

An actuator for the auxiliary cams 30 and 31 comprises an elongated actuator shaft 39 that is axially slidably received in the bore 29' of the cam shaft 19, said actuator shaft 39 being formed to provide a plurality of tapered cam acting portions 40, each operatively associated with a different cooperating pair of auxiliary cam elements 30 and 31. It will be appreciated that all of the tapered cam acting portions 40 taper in the same direction, and that each thereof engages the inner ends of its respective auxiliary cams 30 and 31, as shown in FIGS. 3 and 5. As there shown, axial movement of the actuator shaft 39 in a direction from the left to the right with respect to FIG. 4, will impart axially outward movement to the auxiliary cam elements 30 and 31 from their retracted positions of FIG. 3 to their extended positions shown in FIG. 5. Conversely, axial movement of the actuator shaft 39 from the right to the left with respect to FIGS. 4 and 6 permits yielding bias of the arcuate springs 36 to move their respective auxiliary cam elements 30 and 31 to their retracted positions of FIG. 3.

It will be further appreciated that various means may be employed to control axial movement of the actuator shaft 39. For the purpose of the present example, a governor, indicated in its entirety by the reference character 41 is shown in FIG. 2, as comprising a pair of weight elements 42 and a coil compression spring 43. A hollow shaft extension 44 is secured to the hub portion of the timing gear 22 and flange 23 of the cam shaft 19 by the gear mounting bolts, indicated at 45, the shaft extension 44 being axially aligned with the cam shaft 19. As shown in FIG. 2, the shaft extension 44 projects through an opening 45' in the conventional timing gear cover, indicated at 46, and through an oil seal 47, of conventional design, and a retainer cap or the like 48. A collar 49 is keyed or otherwise rigidly secured to the shaft extension 44 adjacent the retainer cap 48, and carries diametrically opposed ears 50 to which are pivotally connected the outer ends of toggle links 51. A second collar 52 is slidably mounted on the outer end portion of the shaft extension 44 and is formed to provide radially outwardly extending ears 53 to which are pivotally mounted the outer ends of toggle links 54, the inner ends of the toggle links 54 being pivotally connected to the inner ends of adjacent ones of the toggle links 51 and to different ones of the weights 42. The collar 52 is provided with and axially outwardly projecting yoke portion 55 that is rigidly secured to the outer extended end of the actuator shaft 39, outwardly of the outer end of the tubular shaft extension 44, as indicated at 56. As shown in FIG. 2, the coil compression spring 43 is interposed between the collars 49 and 52, and yieldingly urges the collar 52 and actuator shaft 39 in a direction to permit the secondary cam elements 30 and 31 to move inwardly in the passages 29 of the primary cams 24.

During operation of the engine, when the same is operating at low or idling speeds, with a consequent relatively low speed of rotation of the cam shaft 19 and the governor 41 connected thereto, yielding bias of the spring 43 is sufficient to overcome the tendency of the governor weights 42 to move away from the axis of the cam shaft 19 and its extension 44. At these low or idling speeds, the actuator shaft 39 is moved by the spring 43 to its position of FIG. 4, the springs 36 holding the auxiliary cam elements 30 and 31 in their retracted positions of FIGS. 3 and 4. The primary cams 24 are so shaped that, when the auxiliary cam elements 30 and 31 are in their retracted positions, the timing of the valves is substantially as shown in FIG. 9, the intake valve opening at 10° beyond top dead center of a crank associated with the piston, the intake valve closing at 30° beyond bottom dead center position of said crank. Also, with the auxiliary cam elements 30 and 31 fully retracted, an exhaust valve associated therewith opens at 30° before bottom dead center and closes at 10° beyond top dead center, the direction of rotation of the crank, not shown, being indicated as clockwise with respect to FIGS. 7–9 by arrows. When the engine is operated at relatively high speeds, the cam shaft 19 is rotated at correspondingly higher speeds, and the weights 42 overcome the yielding bias of the spring 42 with increasingly greater force as the speed of rotation of the cam shaft 19 increases, until at said high engine speeds, the actuator shaft 39 is moved to its position shown in FIG. 6. At this position of the actuator shaft 39, the auxiliary cam elements 30 and 31 are cammed outwardly to their positions shown in FIGS. 5 and 6, the faces 32 and 33 of the auxiliary cams 30 and 31 being disposed generally radially outwardly of the adjacent surfaces of the primary cams 24. With the auxiliary cams 30 and 31 thus extended, and as the cam shaft 19 rotates, the cam follower lifters 17 are engaged by their respective primary cams 24 and independently by the auxiliary cams 30 and 31 in a manner to provide for a longer valve open period and a shorter valve closed period during a single revolution of the cam shaft 19, than occurs when the engine is running at low or idling speeds. The valve timing at high engine speeds, with the auxiliary cams 30 and 31 extended as shown in FIG. 5, is substantially that which is shown in FIG. 7, the intake valve opening at 20° before top dead center and closing 60° beyond bottom dead center. In like manner, the exhaust valve opens at 60° before bottom dead center and closes 30° after top dead center. The timing of the valves at an engine speed intermediate low and high speeds is shown in FIG. 8.

It will be appreciated that any desired means for moving the actuator shaft 39 may be employed, and that the governor 41 is but one example of such means. By varying the timing of opening and closing of the intake and exhaust valves according to engine speed, operating efficiency of the engine is maintained at a high degree over the entire range of operating speeds thereof, resulting in a considerable savings in fuel due to more thorough combustion thereof, and consequent cleaner exhaust discharge than has been heretofore obtained.

While we have shown and described a commercial embodiment of our improved variable valve timing mechanism, it will be understood that the same is capable of modification without departure from the spirit and scope of the invention as defined in the claims.

What we claim is:

1. Valve operating mechanism for an internal combustion engine involving, a cylinder, a cooperating piston, and a valve for said cylinder, said valve operating mechanism comprising:
   (a) a rotary cam shaft and connections including a cam follower between said cam shaft and valve,
   (b) a primary cam element on said cam shaft and having diametrically opposed arcuate peripheral heel and toe surfaces, a lifting surface tangentially connecting one end of said toe surface to the adjacent end portion of said heel surface, and a lowering surface tangentially connecting the other end portion of said toe surface to the adjacent end of said heel surface, said surfaces engaging said follower in succession responsive to rotation of said cam shaft, engagement of said lifting surface with said follower imparting opening movements to said valve, engagement of said lowering surface with said follower permitting the valve to close, said valve remaining closed during engagement of said follower by said heel surface;
   (c) said primary cam element having a passage extending therethrough transversely of the axis of said cam shaft and communicating at its opposite ends with said lifting and lowering surfaces;
   (d) a pair of auxiliary cam elements each having an operative cam face and each mounted in a different end portion of said passage for movements longitudinally of said passage between retracted positions, wherein said cam faces do not project outwardly beyond their respective primary cam element surface portions, and extended positions wherein said cam faces are disposed laterally outwardly of their respective primary cam element surface portions;
   (e) yielding means urging said auxiliary cam elements toward their retracted positions;
   (f) and a shiftable actuator for moving said auxiliary cam elements simultaneously toward their extended positions against bias of said yielding means;
   (g) said auxiliary cam elements in their extended positions engaging said follower independently of said heel surface and said lifting and lowering surfaces to vary the timing of opening and closing movements of said valve.

2. The structure defined in claim 1 in which said cam shaft defines an axial bore, said passage intersecting said bore, said auxiliary cam elements having generally opposed inner ends projecting into said bore, said actuator comprising an actuator shaft having cam surface portions in said bore engaging said inner ends of the auxiliary cam elements and responsive to movements of said actuator to move said auxiliary cam elements simultaneously toward said extended positions thereof.

3. Valve operating mechanism for an internal combustion engine involving, a cylinder, a cooperating piston, and a valve for said cylinder, said valve operating mechanism comprising:
   (a) a rotary cam shaft and connections including a cam follower between said cam shaft and valve;
   (b) a primary cam element on said cam shaft and having diametrically opposed arcuate peripheral heel and toe surfaces, a lifting surface tangentially connecting one end portion of said toe surface to the adjacent end portion of said heel surface, and a lowering surface tangentially connecting the other end portion of said toe surface to the adjacent end of said heel surface, said surfaces engaging said follower in succession responsive to rotation of said cam shaft, engagement of said lifting surface with said follower imparting opening movements to said valve, engagement of said lowering surface with said follower permitting the valve to close, said valve remaining closed during engagement of said follower by said heel surface;
   (c) said primary cam element having a passage extending therethrough transversely of the axis of said cam shaft and communicating at its opposite ends with said lifting and lowering surfaces;
   (d) a pair of auxiliary cam elements each having an operative cam face and each mounted in a different end portion of said passage for movements longitudinally of said passage between retracted positions, wherein said cam faces do not project outwardly beyond their respective primary cam element surface portions, and extended positions wherein said cam faces are disposed laterally outwardly of their respective primary cam element surface portions;
   (e) said auxiliary cam elements in their extended positions engaging said follower independently of said heel surface and said lifting and lowering surfaces to vary the timing of opening and closing movements of said valve;
   (f) said primary cam element defining a circumferentially extending groove opening outwardly through said heel surface;
   (g) an arcuate spring extending longitudinally within said groove and having opposite end portions operatively engaging said auxiliary cam elements inwardly of the cam faces thereof and yieldingly urging said auxiliary cam elements toward the retracted positions thereof;
   (h) and an actuator for moving said auxiliary cam elements toward the extended positions thereof against bias of said spring.

References Cited in the file of this patent

UNITED STATES PATENTS

| | | |
|---|---|---|
| 733,220 | Krebs | July 7, 1903 |
| 1,894,663 | Burnett | Jan. 17, 1933 |

FOREIGN PATENTS

| | | |
|---|---|---|
| 40,764 | Austria | Jan. 25, 1910 |